(12) United States Patent
Wilhelm et al.

(10) Patent No.: US 8,461,476 B2
(45) Date of Patent: Jun. 11, 2013

(54) METHOD AND DEVICE FOR PLASMA TAP HOLE WELDING

(75) Inventors: Gerald Wilhelm, Unterschleissheim (DE); Erwan Slewert, Munich (DE)

(73) Assignee: Linde Aktiengesellschaft, Munich (DE)

( * ) Notice: Subject to any disclaimer, the term of this patent is extended or adjusted under 35 U.S.C. 154(b) by 513 days.

(21) Appl. No.: 12/627,058

(22) Filed: Nov. 30, 2009

(65) Prior Publication Data

US 2010/0133241 A1 Jun. 3, 2010

(30) Foreign Application Priority Data

Nov. 28, 2008 (DE) .......... 10 2008 044 203

(51) Int. Cl.
*B23K 9/00* (2006.01)

(52) U.S. Cl.
USPC ............ 219/121.46; 219/121.45; 219/121.52; 219/121.54; 219/121.59

(58) Field of Classification Search
USPC ............ 219/121.45, 121.46, 121.48, 121.51, 219/121.52, 121.54, 121.59
See application file for complete search history.

(56) References Cited

U.S. PATENT DOCUMENTS

| | | | | |
|---|---|---|---|---|
| 3,437,787 A | * | 4/1969 | Chyle ................. | 219/137 R |
| 3,582,607 A | * | 6/1971 | Inagaki et al. ........... | 219/137 R |
| 3,803,381 A | * | 4/1974 | Bernard et al. .......... | 219/137.42 |
| 3,865,173 A | | 2/1975 | Rohrberg | |
| 4,849,601 A | * | 7/1989 | Haefner et al. ............... | 219/110 |
| 5,045,667 A | | 9/1991 | Iceland et al. | |
| 5,990,446 A | * | 11/1999 | Zhang et al. ............ | 219/137 PS |
| 6,087,616 A | | 7/2000 | Apunevich et al. | |
| 2005/0247680 A1 | * | 11/2005 | Kwon et al. ............. | 219/121.46 |

FOREIGN PATENT DOCUMENTS

DE 102007017223 10/2008
JP 08025053 1/1996

OTHER PUBLICATIONS

EP 09157120.8 Search Report.

* cited by examiner

*Primary Examiner* — David Vu
*Assistant Examiner* — Sitaramarao S Yechuri
(74) *Attorney, Agent, or Firm* — Fay Sharpe LLP (57) ABSTRACT

In connection with plasma tap hole welding, in which a plasma jet (7) directed towards a workpiece (8) to be welded is generated by means of a welding current applied onto an electrode (2) and a plasma gas, the plasma jet at least partly penetrating through the workpiece (9), wherein at least one electrical conductor (10, 50, 60, 61) is arranged at the exit side (8") of the plasma jet (7), a penetration current ($I_2$) being measured via the electrical conductor (10, 50, 60, 61), it is suggested that the penetration current ($I_2$) is actively modified during the welding process.

15 Claims, 6 Drawing Sheets

METHOD AND DEVICE FOR PLASMA TAP HOLE WELDING

BACKGROUND OF THE INVENTION

The present invention relates to plasma tap hole welding, wherein by means of a welding current provided on an electrode and a plasma gas a plasma jet directed onto a workpiece to be welded is generated, the plasma jet at least partly going through or penetrating through the workpiece, wherein at the exit side of the plasma jet at least one electrical conductor is arranged, via which a current, the so-called penetration current, is measured. The penetration current is then the current flowing between the electrode and the conductor arranged under the workpiece.

Welding designates the connecting of workpieces by material engagement under application of heat and/or pressure. Herein, welding additive materials can be used in connection with known welding methods. For metals, usually melt welding methods with heat application are used. These can, however, also be used for welding of glass or for thermoplastic materials.

In fusion welding, welding is usually performed with locally limited melt flow without application of force and thus without pressure. The connecting or bonding of workpieces is usually achieved in form of a welding seam or a welding point in known methods.

An especially interesting group of welding methods is the so-called shielding or inert gas shielded welding. Inert gas shielded welding is differentiated into a number of clearly distinguishable methods. For example, it is referred to metal shielding gas welding (MSG welding), tungsten inert gas welding (TIG welding) and plasma welding. Amongst the inert gas welding methods, plasma welding takes up a special place, as, due to the contraction of the arc, higher energy concentrations of the plasma are achievable compared to many competing methods.

Plasma welding is counted among the tungsten shielding gas methods (TS-methods). Herein, an arc serves as heat source. The plasma jet is generated by ionization of a gas or gas mixture by the arc. The plasma welding methods can be differentiated according to the type of arc, which either burns as so-called non-transmitted arc between a non-melting, negative (tungsten) electrode and the inside wall of a plasma nozzle, or as so-called transmitted arc between the tungsten electrode and the workpiece. The corresponding methods are known as plasma jet or plasma arc welding (PJ or PAW welding). Modern plasma welding facilities often utilize a combination of PJ and PAW techniques, also known as PJAW welding, in which the non-transmitted arc, which is operated with a few amperes, is used as pilot arc, which, i.a. by means of a pre-ionization of the gas distance, makes possible contactless ignition of the main light current. Fed process gases are ionized by means of said arcs, so that a plasma jet directed to the workpiece is formed, which, for example, can be moved along a desired welding seam path. Up to three gases or gas mixtures can be added in plasma torches or burners, for example via nozzle systems concentrically provided around the electrode; these gases comprise the plasma gas, the focusing gas for contracting the plasma jet and the inert gas or shielding gas.

In known methods, the plasma jet and potentially the focusing gas is encased or shielded by shielding gas. The use of shielding gas i. a. serves to protect the melt from oxidation during the welding process.

Plasma tap hole welding is a variant of plasma welding. Plasma tap hole welding is, as a rule, used for sheet thicknesses of up to 8 to 10 mm. The main application areas lie in chemical facility construction, aviation and space industry as well as container and pipeline construction.

In plasma tap hole welding, the plasma jet usually penetrates through the whole workpiece thickness at the beginning of the welding process. Herein, the melt caused by the melting of the workpiece is pushed to the side by the plasma jet. The surface tension of the melt prevents it falling through the tap hole. Rather, the melt flows together behind the thus formed welding eye and solidifies to form the welding seam.

Plasma tap hole welding is thus usually a method or process, in which a non-melting electrode is used, which is concentrically surrounded by nozzles of the plasma torch, via which at least a plasma gas and a shielding gas are provided. By ionization of the plasma gas with the aid of a pilot arc or a high frequency ignition and by contracting the plasma gas with the aid of a cooled nozzle (plasma gas (copper) nozzle) and a potential additional focusing gas a plasma jet directed to the workpiece to be welded, and encased by shielding gas, is formed. This penetrates the whole/complete workpiece thickness, and pushes the melt caused by the melting of the workpiece to the side, wherein by means of the surface tension of the melt it is prevented from falling through the tap hole. The melt flows together again behind the formed welding eye and solidifies to form the welding seam.

Plasma tap hole welding, a high power welding method, allows the welding of larger sheet thicknesses with lesser thermal distortion and at high welding speeds. Presently, it is generally used for the welding connection of chrome-nickel-steels. Furthermore, this technique is used in case special requirements regarding quality of the welding seam in connection with penetration, seam form and seam appearance apply.

As a rule, the welding seam root penetrating or appearing on the rear side of the workpiece during welding in case of plasma tap hole welding is protected from atmospheric gases by for example water cooled forming gas rails and bath supports. At the same time, the melt is supported hereby. For welding processes, in which welding is performed with a crack or fissure, it is often sufficient to provide a grooved rail made of suitable material (depending on the material of the workpiece for example made of copper, aluminum or stainless steel) on the side of the workpiece opposite the welding nozzle, in which the process (shielding) gas penetrating the workpiece is collected. If expedient, an additional shielding gas (forming gas) can also be provided. Apart from preventing the absorption or acceptance of damaging gases by the root as well as its oxidation the shielding gas also provides a cooling and thus lessens the danger of a falling through of the melt. Also, the shielding gas is advantageous in connection with the forming of the welding seam underside.

For the utilization of plasma tap hole welding, the process-safe provision of the tap hole is a necessary condition. To this effect, an exact welding edge preparation, which requires a lot of time, and a positioning of the workpieces as well as an exact observation of the welding parameters is necessary. In case of deviations from the basic or boundary conditions, for example in case of variable crack dimensions or clearance and edge offsets as well as discontinuities in geometry, which cause a variable heat dissipation in the workpiece, insufficient penetration, spillings, burn dents and a sagging of the weld pool can occur. Especially in case of the most often welded non-alloyed and low-alloyed steels, these process instabilities may occur more frequently due to stronger variation of the chemical composition as well as a lower surface tension and viscosity.

The application of plasma tap hole welding is thus, momentarily, only possible under cost and time intensive procedures in connection with preparation and positioning of the workpiece. Furthermore, the stability of the welding process deteriorates in case of higher sheet thicknesses, so that the weldable sheet thickness is limited. The dominating difficulty especially in connection with plasma tap hole welding of a stable tap hole formation thus limits the industrial applicability of this method substantially in this field.

Plasma tap hole welding is usually performed in a fully automated manner, so that the tap hole formation must be monitored in order to achieve a welding as homogenous as possible. To this end it is known to use optical and pneumatic signals of the welding process for monitoring, in that the brightness of the penetrating (i.e. passing through) plasma jet as well as the pressure resulting from its kinetic energy are used for controlling the process. Also, it is known to utilize the electrical conductivity of the plasma jet exiting on the rear side of the workpiece (referred to in the following as exit side of the plasma jet) as an indication of root fusion directly or indirectly via a supplementary AC circuit between a measuring rail (which can, for example, be part of the mentioned forming gas rail) and the workpiece. The information regarding the height of this so-called penetration or root penetration current, which in known studies is only a few microamperes to a few milliamperes, is used in order to keep the tap hole formation constant via variation of the welding current. In order to achieve this, the welding current is set to a basic level, which is raised to a higher value (pulse level) in case of a lesser penetration current, in order to provide the workpiece with more energy, so that the tap hole becomes wider again. As the thermal resilience of the plasma gas nozzle limits the maximum welding current, however, the performance of the plasma burner can not be fully utilized in the basic current phase, as a "reserve" must always be kept for the pulse level. It follows that the maximum welding speed and the weldable sheet thickness is reduced.

Furthermore, "Double-Sided-Keyhole-Welding" is known. Herein, the arc burns between a plasma and a tungsten inert gas (TIG) welding torch. The workpiece is, after penetration of the workpiece, disconnected from the mains or switched to a currentless state. The provision of a TIG welding torch, however, requires more space and the accessibility of the rear side of the workpiece. Furthermore, only a small influence on the welding seam formation can be achieved by means of the workpiece disconnected from the mains.

The present invention aims to provide a method for plasma tap hole welding, by means of which process stability and handling, especially the stability of the tap hole formation, is enhanced and/or the maximum achievable welding speed is increased.

SUMMARY OF THE INVENTION

This object is achieved by the features of the independent claims. Advantageous embodiments follow from the respective dependent claims and the following description.

Method-wise, the object is achieved in that for plasma tap hole welding, in which a plasma jet directed to a workpiece to be welded is generated by means of an electrode being provided with a welding current and a plasma gas, the plasma jet at least partly penetrating through the workpiece, at least one electrical conductor is provided on the exit side of the plasma jet, via which a penetration current is measured, which is actively changed, especially controlled or regulated, during the welding process.

Herein, "modification of the penetration current" is to mean that the penetration current is actively, i. e. specifically, modified/changed regarding its amplitude and/or its shape. This shall also comprise actively modifying shape and geometry of the penetration current flow. These changes cause corresponding changes in strength as well as shape and geometry of the plasma jet and/or the corresponding arc.

"Workpiece" is to mean the material to be welded, which shall be processed by the welding method. Especially it is to mean two or more elements, which are to be welded together cohesively, for example by butt joint (I-joint) or overlapping joint.

According to the invention, the penetration current is measured online, in situ, and utilized as output variable for controlling the plasma tap hole welding process. The penetration current is herein actively modified regarding its amplitude, for example in a range from 0-100%, whereby the plasma tap hole formation can be controlled. Thus, the formation of the seam geometry, and process variations can be reacted to. A regulation of the penetration current allows a precise control of the current supplied to the workpiece, and thus of its energy absorption.

As outlined above, the thermal resilience of the plasma gas nozzle limits the maximum utilizable welding current. In order to be able to increase this in corresponding known methods, it is necessary to provide a corresponding additional modification range, and to operate the nozzle at correspondingly lower values in the normal state or under normal conditions.

According to the invention, a corresponding welding torch can be operated maintaining safe values close to the thermal resilience limit, as no reserve range must be provided for a corresponding increase of welding current (pulse level). By means of the thus achievable improvements over the prior art, the maximum welding speed and the weldable sheet thickness can be increased.

By ensuring a safe root penetration/fusion and the online collecting of the penetration current with a corresponding documentation, the effort for quality control can be significantly lowered. In case the welding current based energy transfer is influenced, it is potentially also possible to introduce less energy into the workpiece, thus reducing distortions. By means of the method according to the invention it is rendered possible to weld materials such as non-alloyed steels, especially inhomogeneous materials, with plasma tap hole welding, which momentarily are critical regarding welding. Hereby, plasma tap hole welding can now also be used on a larger scale for connection welding in container construction, rail car construction, shipbuilding, automobile industry and similar application areas.

Let it be known in this connection that the method according to the invention does not preclude an additional modification of the welding current, as is known from the prior art, as well as of other actuating variables, insofar as the penetration current is actively modified. Also, the method according to the invention does not preclude the use of further detection methods, especially the known optical and/or pneumatic techniques. Such methods can, if expedient, be used supportively.

According to the invention, the penetration current can advantageously be modified by means of variable electrical resistances/resistors by means of power switches and/or by means of a variation of the distance between the electrical conductor and the workpiece. Especially, the distance between the workpiece and the electrical conductor can be set or modified continuously.

In this connection, it should be differentiated between a so-called "outer control" and an "inner control", as referred to in the following. The outer control refers to the active influencing of the current flowing through corresponding resistors, power switches and distance control devices. The inner control, which goes on without active influencing, is based on the following phenomenon: In case the tap hole closes due to process based circumstances, more energy is conducted into the workpiece by means of electrons, so that the tap hole opens up again due to the increased energy input. On the other hand, in case of a wide open tap hole, more energy reaches the conductor (and less energy the workpiece), so that the tap hole decreases in size again. The inner control can especially be utilized in case of small changes to boundary conditions during the welding process. According to the invention, a combination of different control methods can be used. Thus, a rough setting of the amplitude of the penetration current, which is maintained over an extended length of time, can be achieved by means of an outer control. Within said range of time, the tap hole formation can be kept constant by means of inner control. Herein, for example, the outer control can be adjusted in case of foreseeable changes in the material to be welded (for example an increase of material thickness) in an active way in response to these changes, whereas the inner control can be used for non-foreseeable material changes, which do, for example, not exceed a certain, potentially definable amount (for example changes in the composition of the alloy).

An outer control of the penetration current by means of adjustable electric resistors can be utilized in an advantageous way especially for strong, but slowly occurring changes of the boundary conditions during the welding process. On the other hand, power switches can control the penetration current especially in case of large and rapid changes of the boundary conditions during the welding process.

According to an especially advantageous embodiment of the present invention, the penetration current is adjusted periodically, stepwise, continuously or adjusted to the conditions of the welding process, optionally also in combination with utilization of a further external current between workpiece and copper rail. In case the penetration current shows certain characteristics, as for example a certain amplitude, frequency or waveform, a corresponding change can, if expedient, be made by means of filter(s) and frequency transformers. A corresponding change and/or utilization includes a stepwise and/or continuous modification of the current, in order to be able to react to changes in an expedient manner. For example a certain recognized change of the measured penetration current can lead to a current adjustment which is only performed slowly and continuously, in order to be able to avoid sudden large and disadvantageous system jumps.

Advantageously, in a method according to the present invention, variable process parameters (for example edge offset, width of crack or fissure (gap), workpiece geometry) can be derived on the basis of the measured penetration current, and the change in the penetration current can be effected on the basis of the variable process parameters. It is to be understood that, apart from a detection of changes of the penetration current, also an initially known material change, for example a known, predictable increase of material strength or thickness can be utilized to effect a modification of the penetration current. For example, in connection with a serial production utilizing current profiles, each workpiece can, initially for a first period of time (corresponding to a first welding distance), be welded with a first set penetration current, to be followed by a second period of time (corresponding to a second welding distance) with a second penetration current.

Advantageously, on the basis of the measured penetration current as variable process parameter, the root penetration as well as the width of the crack and the edge offset of the welding joint can be derived. A change in the penetration current can then be effected on the basis of these variable process parameters. As opposed to hitherto known methods, the penetration current is, herein, not exclusively used as indicator of a root penetration.

Advantageously, for plasma tap hole welding, apart from a plasma gas, a focusing gas, and an inert or shielding gas and/or a forming gas are used, wherein, as the already mentioned plasma gas, as focusing gas, as inert gas and/or as forming gas, a gas or gas mixture can be used, which is chosen from the group consisting of argon, helium, hydrogen, carbon dioxide, oxygen and mixtures thereof. Exemplary gases or gas mixtures contain argon or argon with a maximum of 7% hydrogen (plasma gas), argon-helium-mixtures with higher hydrogen fractions (focusing gas), mixtures of the inert gases argon and helium with the addition of further gases such as hydrogen or nitrogen (shielding gas) and gas mixtures having a slightly reducing effect with nitrogen and hydrogen (forming gas). By means of usage of optimal gas mixtures, the welding result can be positively influenced.

According to an advantageous embodiment within the context of the method according to the invention at least one water cooled copper rail, especially in form of a forming gas rail as used in hitherto known plasma tap hole welding methods for providing a corresponding shielding gas and for measurement of the penetration current is used as at least one electrical conductor. It is to be understood that, depending on the field of use of the method, other materials apart from copper can also be used, and that, if in the following a "copper rail" is referred to, this should be understood as also comprising other materials. The workpiece is electrically insulated from the copper rail. The forming gas rail is expediently formed in a U-shape. The sides of the U-profile can be made of electrically non-conducting material, the basis comprises the copper rail used as conductor. The open side of the forming gas rail constructed in U-form is directed in the direction of the workpiece. The workpiece and the copper rail are, within the context of the method according to the invention, separately connected to a pole of the plasma welding current source by means of electrical also electrical cables.

Advantageously, according to a preferred embodiment, two or more electrical conductors can be used, via which the penetration current is guided. In this way, the shape or geometry of the penetration current flow and thus the plasma jet can be influenced. The (two) electrical conductors can be provided as parallel copper rails in a corresponding forming gas rail. The basis of the U-shaped forming gas rail herein consists of two separate, electrically separated water cooled copper rails. Each copper rail is connected to power switches separately via electrical cables, the power switches in turn both being directed to a pole of the plasma welding current source. Hereby, the thermal distortion of the workpiece can be minimized by providing an X-shaped seam profile or section. It is to be understood that it can also be provided to set the individual copper rails separately from one another or together by further setting means, and, if expedient, to measure and/or to change the current flowing on each individual copper rail. Hereby, it is possible to provide or influence further advantageous jet geometries. To this end, it is also possible to use two copper rails with different geometry (for example different width and/or surface features). It is also to be understood that the invention is not limited to the use of only one or two rails, but that also any other number of rails can be used, without leaving the claimed scope.

The invention also comprises a device for plasma tap hole welding with at least one electrode acted upon by a welding current and at least one nozzle for a plasma gas, whereby a plasma jet can be generated, and at least one electrical conductor, wherein between the electrode and the conductor a workpiece to be welded can be placed, as well as means for measuring a penetration current between the workpiece and the at least one electrical conductor, the device further comprising, according to the invention, means for actively changing/modifying the penetration current. The device according to the invention is especially suitable for performing the method according to the invention, and comprises all features in order to effect this method.

Advantageously, a corresponding device comprises variable resistors, power switches and/or distance setting means for modifying the distance between the electrical conductor and the workpiece as means for modifying the penetration current. Hereby, especially an external control as described above in connection with the method according to the invention, can be effected. Obviously, a number of means can be provided in combination. Advantageously, by means of using controllable resistors (potentiometers), stronger, but slower modifications of the penetration current can be achieved. For fast, large modifications corresponding power switches can be provided.

According to an advantageous embodiment, the device comprises at least one conductor rail as at least one electrical conductor. By using conductor rails made of different materials (for example copper in case of welding of steel, or stainless steel in case of welding of aluminum or copper) a corresponding device can be utilized for the handling/processing of different materials.

Advantageously, the at least one conductor rail is part of at least one forming gas rail. Hereby, it is possible to utilize a corresponding, existing welding device for the method according to the invention, without having to make substantial structural changes.

The provision of a U-shaped forming gas rail with the open side facing towards the exit side of the plasma jet and perpendicular hereto can be advantageous, wherein at least one water cooled copper rail is provided as at least one electrical conductor.

According to an advantageous development, the U-shaped forming gas rail with the open side directed towards the exit side of the plasma jet and perpendicular hereto comprises two water cooled copper rails as electrical conductors, which are separated by a non-conducting element, wherein the sides of the U-shaped forming gas rail facing the exit side of the plasma jet comprise a non-conducting material. By means of the non-conducting sides, a direct contact between the forming gas rail and the workpiece can be achieved, whereby the forming gas rail can have a stabilizing function. By means of the two electrical conductors provided next to one another, the penetration current can be conducted onto both rails, whereby on the one hand a special, advantageous profile of the welding seam as described above can be achieved, and also the energy absorption and the heating of the individual conductors can be reduced hereby. These measures thus lead to a reduced cooling effort.

BRIEF DESCRIPTION OF THE DRAWINGS

The invention as well as further embodiments of the invention will now be described in more detail referring to the embodiments shown in the appended figures.

In the figures, like reference numerals designate like or corresponding elements. A repeated/repetitive description will thus be omitted in the following for reasons of simplicity.

DETAILED DESCRIPTION OF THE INVENTION

Figure 1:
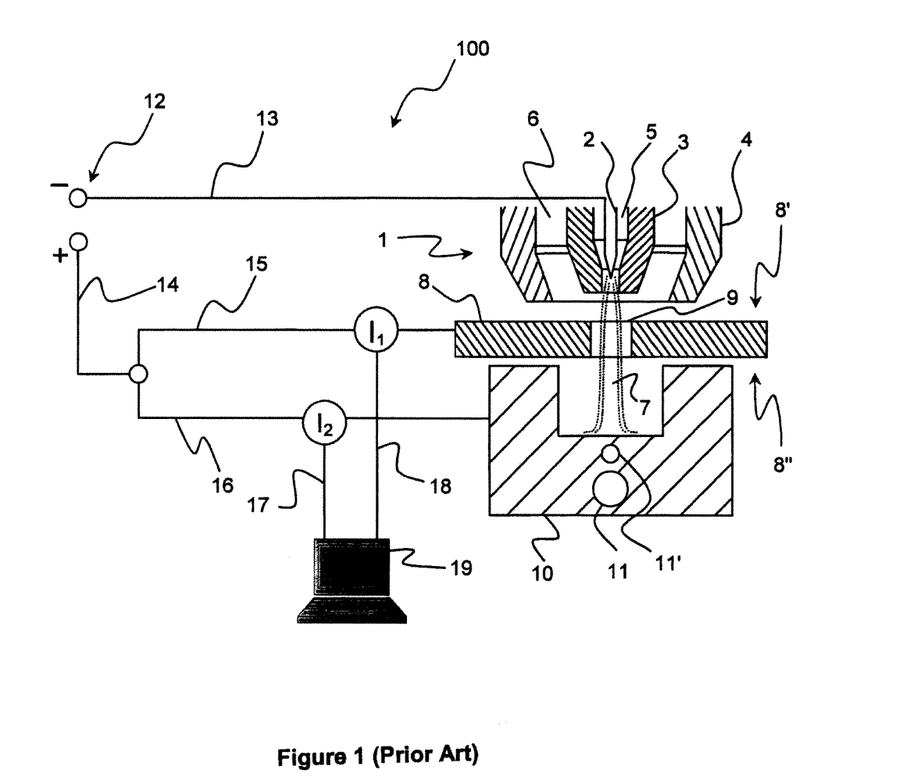
FIG. 1 shows a schematic representation of a device for plasma tap hole welding according to the prior art.

In FIG. 1, a device for plasma tap hole welding according to the prior art is shown in a sectional view and as a whole designated by 100. The device comprises a welding torch 1, which is directed towards a workpiece 8. The welding torch 1 comprises an electrode 2, preferably a non-melting tungsten electrode 2, which is connected with the negative pole of a welding current source 12 via lead 13. The electrode 2 is surrounded by a first nozzle 3, in the lumen 5 of which a plasma gas is provided. A further nozzle 4, which concentrically surrounds the first nozzle and the electrode, is provided, in the lumen 6 of which a further gas, for example a focusing gas and/or an inert or shielding gas can be provided. Further surrounding, concentrically arranged nozzles for providing further gases can be provided, but are, for reasons of simplicity, not shown. Under the influence of a voltage applied to the electrode 2 in the presence of plasma gas 5, a plasma jet 7 is formed.

In FIG. 1, it is shown how plasma jet 7 penetrates through the workpiece 8 through a tap hole 9 from an entrance side 8' towards an exit side 8''. On the exit side 8'' of the plasma jet 7 an electrical conductor 10 is provided, which, to simplify the representation, is shown hatched in FIG. 1. It is, however, as explained above, advantageous, if the electrical conductor 10 is provided as a metallic rail 10 as part of a corresponding forming gas rail, which has a U-shaped profile, the opening of which is directed towards the workpiece. As a rule, only the inner basis of the profile is provided in an electrically conductive manner within the context of such an embodiment, while the sides directed towards the workpiece are made of insulating material. In the electrical conductor 10 and/or the corresponding forming gas rail, channels 11, 11' are provided, which are channels for water cooling and/or channels, by means of which an inert gas or a corresponding further gas can be provided. The electrical conductor 10 is connected to the positive pole of the welding current source 12 via leads 14 and 16, and the workpiece 8 via leads 14 and 15. Furthermore, in FIG. 1, a measuring or evaluation unit 19, here symbolized as a computer, is shown, which measures the total current $I=I_1+I_2$, and the penetration current $I_2$. The current flowing between electrode and workpiece is designated $I_1$. The penetration current varies in dependence on variable process parameters.

Figure 2:
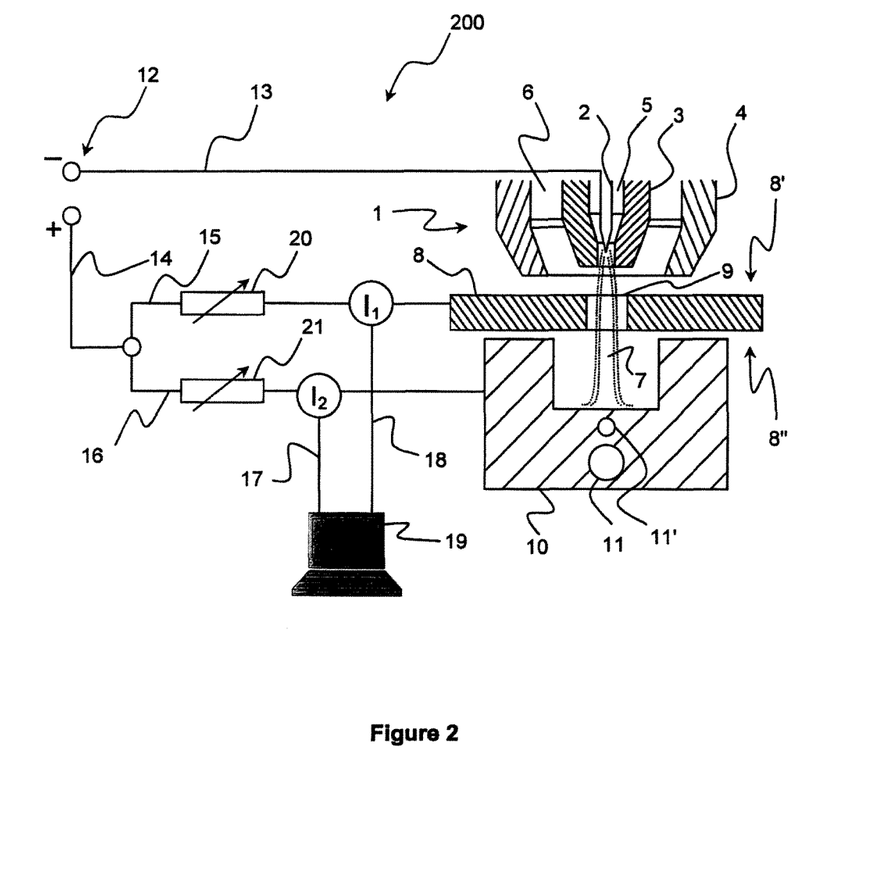
FIG. 2 shows a schematic representation of a device for plasma tap hole welding, which is suitable for a method according to an especially preferred embodiment of the invention.

FIG. 2 shows a device for plasma tap hole welding according to an especially preferred embodiment of the present invention, and is in its entirety designated 200. Device 200 corresponds to device 100 of FIG. 1 to a large extent, with the difference that in leads 15 and 16 to workpiece 8 and conductor 10 variable resistors 20 and 21 respectively are provided. By means of a variation of the variable resistors 20 and 21, it is possible to modify the penetration current $I_2$. Device 200 is especially useful for a setting and monitoring of the penetration current $I_2$, in the context of which additionally the inner control, as explained above, can be utilized. Thus, device 200 is especially suitable also for small changes of the boundary conditions in the welding process. Herein, a rough setting of the amplitude of the penetration current $I_2$ can be achieved via the variable resistors 20, 21, which can then be kept constant over an extended period of time. During this period of time, a tap hole formation can be kept constant by means of an inner control or regulation. The modification of the penetration current $I_2$ by means of the variable resistors 20, 21 can, for example, take into account different materials or alloys, which are to be processed in the device. Especially a variable material strength or thickness can be taken into account. While the variable resistors in FIG. 2 are shown as not connected to further devices, it is, especially, possible to provide a modification of the variable resistors 20, 21 via further control devices. In the context of FIG. 2 and in connection with device 200, the measuring and monitoring device 19 serves only for monitoring the penetration current.

Figure 3:
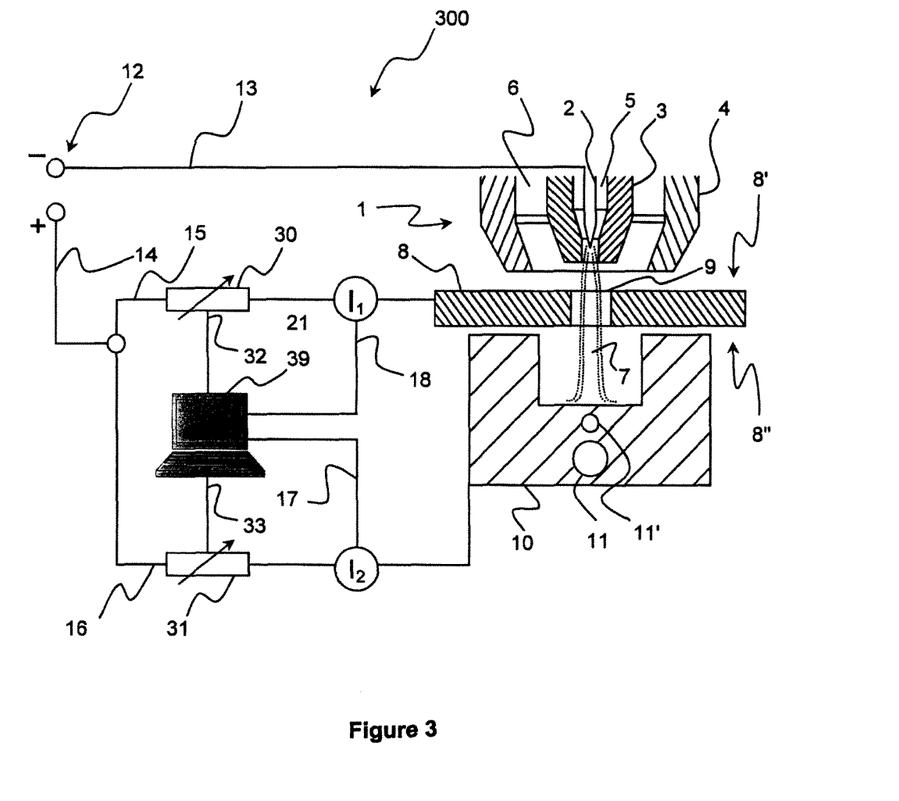
FIG. 3 is a schematic representation of a further device for plasma tap hole welding, which is suitable for a method according to a specifically preferred embodiment of the invention

In FIG. 3, a device for plasma tap hole welding according to an especially preferred embodiment of the invention is shown and is, in its entirety, designated 300. Device 300 corresponds to device 200 of FIG. 2 to a large extent. Differing from device 200, device 300 comprises a measurement and control unit 39, which, additionally to the connection to the variable resistors, here designated 30 and 31, via the measurement leads 17, 18, is connected via control leads 32, 33. The setting (control) of the variable resistors 30, 31 can be effected via control leads 32 and 33. By means of device 39 thus a continuous (in situ) monitoring and controlling of the penetration current $I_2$ is possible via the variable electrical resistors 30, 31. Device 300 is thus especially suitable for strong, slowly occurring changes of the boundary conditions during the welding process. Due to the reaction time of the device, FIG. 3 is less suitable for rapid changes of the penetration currents $I_2$.

Figure 4:
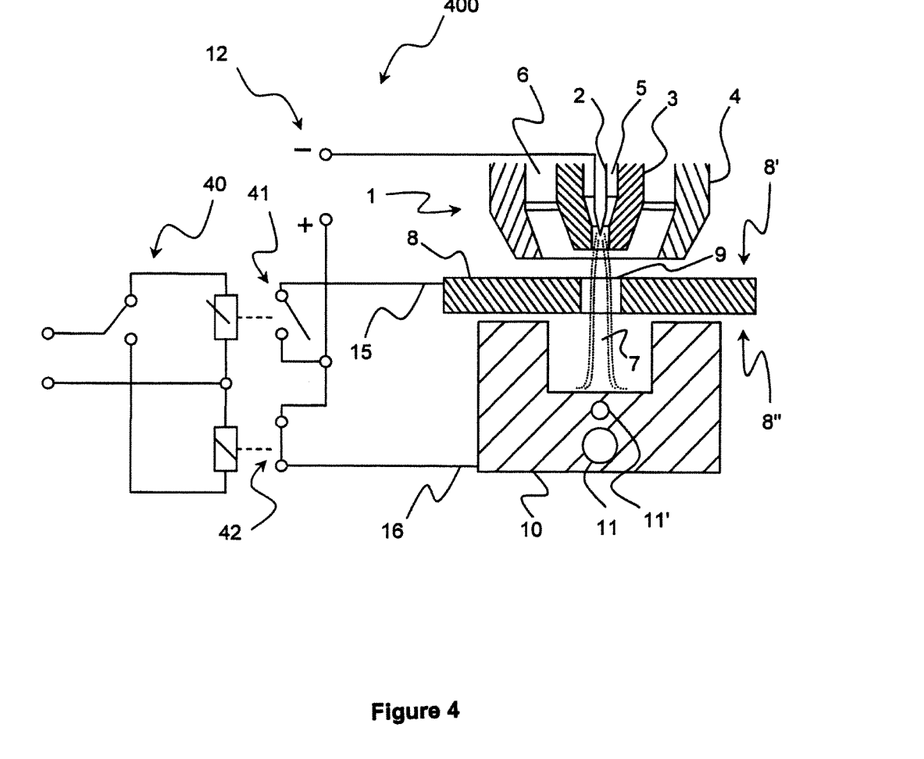
FIG. 4 is a schematic representation of a further device for plasma tap hole welding, which is suitable for a method according to a specifically preferred embodiment of the invention.

In FIG. 4, a device is shown and, in its entirety, designated 400. In contrast to the previous figures, this figure does not show, for reasons of simplicity, the measurement of penetration current $I_2$. It is to be understood, however, that device 400 can also comprise a corresponding measurement device. In the device, a power switch control unit 40 is shown, via which the power switches 41, 42 can be actuated. Via power switches 41, 42, it is possible to separate workpiece 8 and/or lead 10 quickly from the positive pole of the welding current source 12, as well as to connect the corresponding elements herewith. By means of the directly occurring switching of power switches 41, 42 large, fast changes of the boundary conditions during the welding process can be taken into account and/or reacted to. Thus, for example, material faults, which in case of a continuation of the welding process would endanger the welding result, can rapidly be taken into account in form of a corresponding (emergency) switching.

Figure 5:
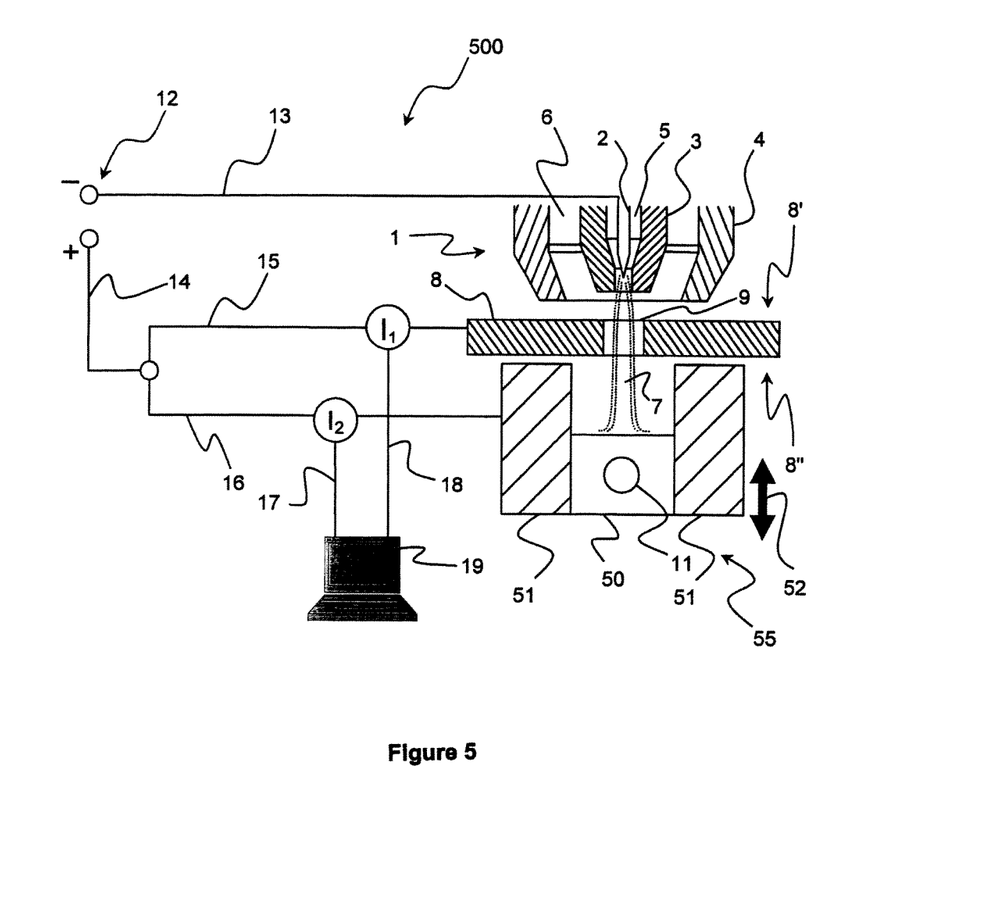
FIG. 5 is a schematic representation of a further device for plasma tap hole welding, which is suitable for a method according to a specifically preferred embodiment of the invention.

In FIG. 5, a device for plasma tap hole welding according to an especially preferred embodiment of the invention is shown and, in its entirety, designated 500. Device 500 corresponds in large parts to the device of FIG. 1. Differing from device 100 of FIG. 1, the unit 55 arranged on the exit side 8" of the plasma jet, which corresponds essentially to unit 10 of FIG. 1, is, as shown by up-down-arrow 52, moveable towards the workpiece 8 and away from it. By means of a continuous adjustment, the penetration current $I_2$ can be influenced hereby. The penetration current $I_2$ is assumed as correlating to the distance between unit 50 and workpiece 8, the change in the penetration current due to the change of distance being caused by an increase of the resistance of the arc. Unit 55 is shown in FIG. 5 in detail. Unit 55 is a forming gas rail, comprising a metallic part 50 and a non-metallic and/or insulating part 51 in a U-configuration. The U-shaped forming gas rail 55 is directed towards the workpiece 8 with its open side. In the metallic part 50, a channel 11 is formed, which can especially serve for the cooling of rail 50. Be it noted that a movement of the copper rail 50 in direction of arrow 52 (also within the insulating material) can occur especially additionally to the control mechanisms described above in the context of the previous figures. Especially, a corresponding device can comprise a number of said features by themselves and/or in arbitrary combination or arrangement.

Figure 6:
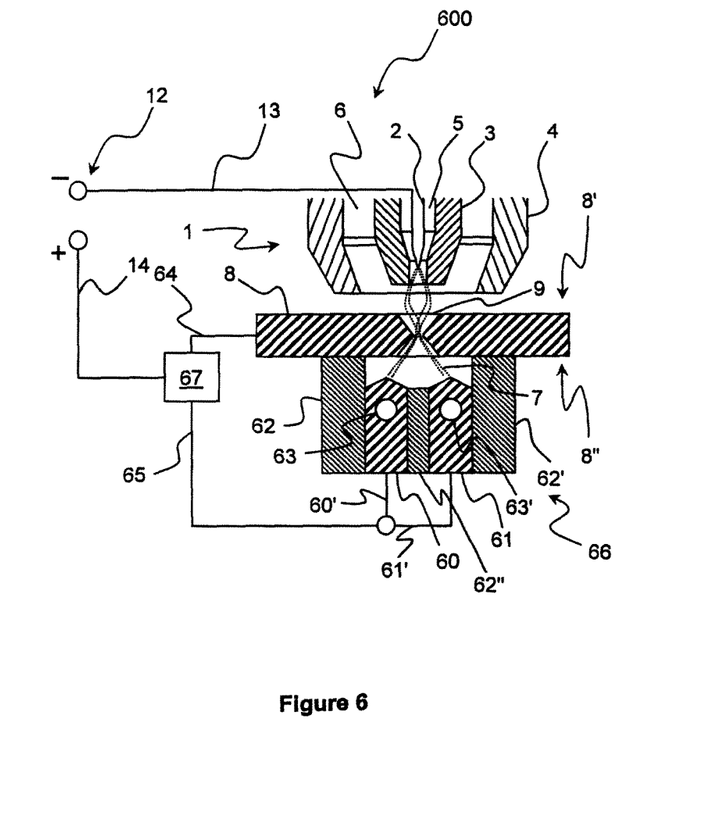
FIG. 6 is a schematic representation of a further device for plasma tap hole welding, which is suitable for a method according to a specifically preferred embodiment of the invention.

In FIG. 6, a device for plasma tap hole welding according to an especially preferred embodiment of the invention is shown and, in its entirety, designated 600. In FIG. 6 especially unit 66, which corresponds to forming gas rail 55 and/or conductor 10 in the previous figures, is shown in detail. Device 600 can also be provided with corresponding control mechanisms and devices for influencing the penetration current $I_2$, which, within the context of FIG. 6, are, in summary, designated with reference numeral 67. Control device 67 can especially be provided with means for acting upon the workpiece with further currents and/or voltages. Device 600 comprises a forming gas rail 66, which is made of two metallic (conducting) elements 60, 61 and three non-conducted (insulating) elements 62, 62', 62". Be it noted that the device can also be provided with any other number of conducting elements 60, 61. While the conducting elements 60, 61 are shown as geometrically identical, it is especially also possible to use different geometries and/or surface characteristics or designs. The conducting elements 60, 61 represent metallic rails, which, in the representation, are provided with water cooling channels 63, 63'. The conducting elements are connected to one another by means of non-conducting elements 62, 62', 62", and together form the forming gas rail. In the representation of FIG. 6, the conducting elements 60, 61 are connected together via leads 60', 61', and via lead 65, in analogeous way to lead 16 of the previous figures, to control and/or measurement device 67. It is clear that the individual rails 60, 61 can also be connected to control and/or measurement device 67 independently from one another. Workpiece 8 is also connected to the control and/or measurement device 67 by means of a lead 64. By means of the specific embodiment of the forming gas rail 66, it is possible to guide the penetration current onto two points of the forming gas rail. Hereby, a welding seam with very small distortions can be achieved, in that a focusing effect of the plasma jet at the level of the workpiece and an extension of the arc at the anode is achieved, as shown in FIG. 6.

The drawings, the description and the claims comprise numerous features in combination. The person skilled in the art will, expediently, also consider these features on their own, and combine them to meaningful further combinations. It is obvious, that only exemplary embodiments of the invention are shown in the figures. Apart from these, any further embodiment is conceivable, without leaving the scope of the invention.

The invention claimed is:

1. Method for plasma tap hole welding, wherein a plasma jet directed onto a workpiece to be welded is generated by means of a welding current applied to an electrode and a plasma gas provided by a cooled nozzle, at least a part of the plasma jet penetrating through the workpiece, wherein on the exit side of the plasma jet at least one electrical conductor is arranged, via which a penetration current ($I_2$) is measured, and wherein the penetration current ($I_2$) is actively modified during the welding process by a modification of the distance between the at least one electrical conductor and the workpiece.

2. Method according to claim 1, wherein the penetration current ($I_2$) is further modified by at least one of variable electrical resistors and power switches.

3. Method according to claim 1, wherein the penetration current ($I_2$) is modified periodically, stepwise, continuously or in situ and/or by at least one further external current applied to it.

4. Method according to claim 1, wherein variable process parameters are derived on the basis of the measured penetration current ($I_2$), and the modification of the penetration current ($I_2$) is effected on the basis of the variable process parameters.

5. Method according to claim 4, wherein root penetration, gap or crack width and/or the edge offset of the welding joint are used.

6. Method according to claim 1, wherein further to the plasma gas a focusing gas, an inert or shielding gas and/or a forming gas are used, a gas or gas mixture selected from the group consisting of argon, helium, hydrogen, carbon dioxide, oxygen and mixtures hereof being used as plasma gas, focusing gas, inert or shielding gas and/or as forming gas.

7. Method according to claim 1, wherein at least one water cooled copper rail which is arranged in forming a gas rail, is used as at least one electrical conductor.

8. Method according to claim 1, wherein at least two electrical conductors are provided, and the penetration current ($I_2$) is conducted over the at least two electrical conductors.

9. Device for plasma tap hole welding comprising at least one electrode, onto which a welding current can be applied, and at least one nozzle for a plasma gas whereby a plasma jet can be generated, and at least one electrical conductor wherein a workpiece to be welded can be arranged between the electrode and the conductor, as well as means for measurement of a penetration current between the electrode and the at least one electrical conductor, wherein the device further comprises means for active modification of the penetration current ($I_2$) by a modification of the distance between the at least one electrical conductor and the workpiece.

10. Device according to claim 9, wherein the means for modification of the penetration current ($I_2$) further comprises at least one of variable resistors, and power switches.

11. Device according to claim 9, wherein the device comprises at least one conductor rail, especially two conductor rails, and at least one electrical conductor.

12. Device according to claim 11, wherein the at least one conductor rail is part of at least one forming gas rail.

13. Device according to claim 12, wherein the device comprises a U-shaped forming gas rail, the open side of which being directed towards the exit side of the plasma jet and perpendicular hereto, and at least one water cooled copper rail is provided as at least one electrical conductor.

14. Device according to claim 13, wherein the U-shaped forming gas rail, the open side of which is directed towards the exit side of the plasma jet and which is arranged perpendicular hereto, comprises two water cooled copper rails as electrical conductors, which are separated by a non-conducting element, and further the sides of the U-shaped forming gas rail facing the exit side of the plasma jet comprise a non-conducting material.

15. Device for plasma tap hole welding comprising at least one electrode, onto which a welding current can be applied, and at least one nozzle for a plasma gas whereby a plasma jet can be generated, and at least one electrical conductor wherein a workpiece to be welded can be arranged between the electrode and the conductor as well as means for measurement of a penetration current between the electrode and the at least one electrical conductor and further including a computer hosting a program code for plasma tap hole welding, wherein a plasma jet directed onto a workpiece to be welded is generated by means of a welding current applied to an electrode and a plasma gas provided by a cooled nozzle, at least a part of the plasma jet penetrating through the workpiece, wherein on the exit side of the plasma jet at least one electrical conductor is arranged, via which a penetration current is measured and wherein the penetration current is actively modified during the welding by the computer guided adjustment of the distance between the at least one electrical conductor and the workpiece.

* * * * *